United States Patent [19]
Roberts

[11] Patent Number: 5,794,698
[45] Date of Patent: Aug. 18, 1998

[54] USE OF OLEOPHILIC WICK FOR REMOVING NON-AQUEOUS LIQUIDS FROM A SUBTERRANEAN FORMATION

[75] Inventor: Charles T. Roberts, Richardson, Tex.

[73] Assignee: Atlantic Richfield Company, Los Angeles, Calif.

[21] Appl. No.: 871,794

[22] Filed: Jun. 9, 1997

[51] Int. Cl.$^6$ ................................................. E21B 43/00

[52] U.S. Cl. .................. 166/265; 166/370; 405/59; 405/62; 405/128

[58] Field of Search ............................ 166/265, 369, 166/370; 405/52, 53, 59, 62, 128

[56] References Cited

U.S. PATENT DOCUMENTS 3,843,306 10/1974 Whittington et al. ................. 431/8
4,872,994 10/1989 Jakob ................................ 166/265 X
5,252,000 10/1993 Mohs ............................... 166/369 X

OTHER PUBLICATIONS

"Groundwater", R. Allan Freeze and John A. Cherry, p. 39; Prentice–Hall, Inc., Englewood Cliffs, NJ 007631, 1979

"Material Safety Data Sheet", Product Identification: XSORB®Univrsal Super Absorbent; Product Description: All purpose absorbent for liquids and semi–liquids; Manufacturer: Impact Absorbent Technologies, Inc., P.O. Box 1131, Atascadero, CA 93423, Jan. 1, 1996.

Primary Examiner—Roger J. Schoeppel
Attorney, Agent, or Firm—F. Lindsey Scott

[57] ABSTRACT

A system and method for removing light non-aqueous liquids via a wellbore from at least a water-saturated subterranean zone using an oleophilic absorbent wick by positioning the wick in a wellbore extending from the surface through at least a portion of the subterranean water-saturated zone; reducing the pressure in the wellbore and removing vaporized light non-aqueous liquids from the wellbore.

11 Claims, 2 Drawing Sheets

USE OF OLEOPHILIC WICK FOR REMOVING NON-AQUEOUS LIQUIDS FROM A SUBTERRANEAN FORMATION

BACKGROUND OF THE INVENTION

1. Field of the Invention

This invention relates to a method for removing light non-aqueous liquids via a wellbore from at least one of a vadose zone, a capillary fringe zone and a water-saturated zone using an oleophilic absorbent wick.

2. Brief Description of Prior Art

It is a common occurrence at various petroleum processing, marketing, distributing or other related sites such as service stations, refineries, natural gas processing plants and the like that light hydrocarbons, hydrocarbon-based products or other light non-aqueous liquids may be spilled or otherwise escape into the soil. Such hydrocarbons or non-aqueous liquids which may be spilled in these or other types of operations migrate downwardly through the soil and frequently accumulate in a layer on top of the water table. The water table is in a water-saturated formation or zone which generally has some permeability and porosity to water so that water moves through the water-saturated formation at a liquid level generally referred to as the water table in a direction dictated by the slope of the water-saturated formation or other forces which may act on the water in the water-saturated subterranean zone. There is a water-wet area referred to as the capillary fringe zone just above the water-saturated zone. The area above the capillary fringe zone is referred to as the vadose zone. Generally, if coarse particulate material makes up the subterranean zone above the water table, the capillary fringe zone will be relatively thin. Conversely, if the zone above the water table is a fine-grained formation, the capillary fringe zone may be quite large. The capillary fringe zone can vary from less than one inch to several feet in width. In either event, the light non-aqueous liquids tend to move downwardly through the vadose zone and the capillary fringe zone to form a layer above the water-table. The removal of such light non-aqueous liquids has been attempted by positioning wells to penetrate the water table and creating a vacuum or reduced pressure in such wells in an attempt to vaporize the light non-aqueous liquids from the water-table. This method is subject to the major drawback that very small surface areas of the light non-aqueous liquids at the water table are exposed. Since the layer of light non-aqueous liquids is positioned on top of the water table, only the surface area at the top of the water table in the cross sectional area of the wellbore is exposed for the evaporation of the light non-aqueous liquids. Light non-aqueous liquids positioned in the vadose zone or capillary fringe zone are available for vaporization only at the wellbore. If the wellbore is cased with a solid casing through a majority of the vadose zone then the area available for vaporization is very limited. For a variety of environmental reasons, it is desirable to recover such light non-aqueous liquids from the water table and the overlying formations. Accordingly, a continuing search has been directed to the development of more effective methods for recovering such light non-aqueous liquids.

SUMMARY OF THE INVENTION

According to the present invention a method is provided for removing light non-aqueous liquids and vapors via a wellbore from at least one of a vadose zone, a capillary fringe zone and a water saturated zone using an oleophilic absorbent wick.

The method further comprises positioning a wellbore from the surface to extend through at least a portion of a subterranean water-saturated zone; positioning an oleophilic absorbent wick in the wellbore, the wick being positioned with its lower end extending below a liquid level in the wellbore and its upper end extending above the liquid level; reducing the pressure in the wellbore thereby vaporizing light non-aqueous liquids from a portion of the wick extending above the liquid level in the wellbore; and, withdrawing vaporized light non-aqueous liquids from the wellbore.

The present invention also comprises a system for removing light non-aqueous liquids via a wellbore from at least one of a vadose zone, a capillary fringe zone and a water saturated zone using an oleophilic absorbent wick. The system comprises a wellbore positioned from a surface location to penetrate a subterranean water-saturated zone; an oleophilic wick positioned in the wellbore with its lower end extending below a liquid level in the wellbore and its upper end extending above the liquid level; a line in fluid communication with the wellbore and a vaporized light non-aqueous liquids vapor outlet; and a blower in fluid communication with the line and the vapor outlet.

DESCRIPTION OF THE PREFERRED EMBODIMENTS

In the description of the FIGURES the same numbers will be used throughout to refer to the same or similar components.

Figure 1:
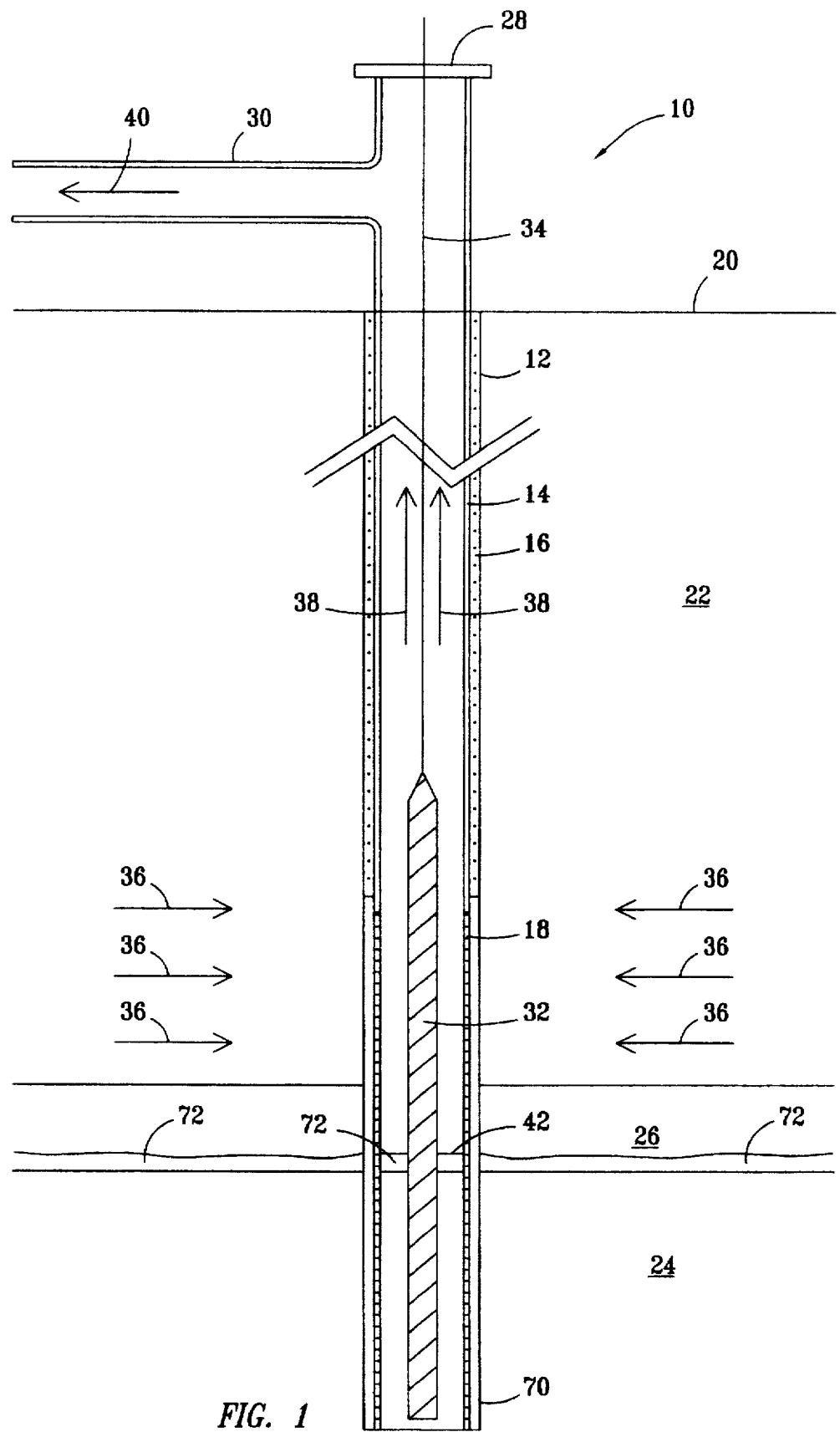
FIG. 1 shows a wellbore penetrating a vadose zone, a capillary fringe zone and a water-wet zone and including an oleophilic absorbent wick supported in the wellbore.

In FIG. 1 a soil vapor extraction well 10 is shown. Well 10 comprises a wellbore 12 which has been cased with a casing 14 to a selected depth. Casing 14 is cemented in place by cement 16. Cement 16 is positioned in the annular space between the outside of casing 14 and the inside of wellbore 12 by means known to those skilled in the art. A screen 18 is positioned in wellbore 12 beneath casing 14, and as shown, extends through a capillary fringe zone 26 and into a water-saturated zone 24 positioned beneath the capillary fringe zone 26. Wellbore 12 extends from a surface 20 through an overburden 22 (vadose zone) to penetrate subterranean zones 24 and 26. Well 10 includes a wellhead 28 and a line 30 for the withdrawal of vapors from wellbore 12. Vapors are recovered through line 30 as shown by an arrow 40. Wellhead 28 includes equipment for suspending an oleophilic absorbent wick 32 in wellbore 12 with a portion of wick 32 extending into the wellbore beneath a liquid level 42 in wellbore 12. Liquid level 42 generally corresponds to the water table. In some instances, the level may be higher than the water table. Wellbore 12 may be cased to a greater or lesser depth than shown in FIG. 1 and screen 18 may extend to a lesser depth then shown although it is desirable that screen 18 extend below the lowest depth at which the water table will be found as a result of seasonal fluctuations and the like. Screen 18 may be any suitable permeable material and may comprise an actual screen-like member, a perforated metallic casing or the like, as known to those skilled in the art. Wellbore 12 extends into but need not penetrate through the entire depth of water-saturated subterranean zone 24.

A water-wet, but not water-saturated zone 26 (capillary fringe zone) is positioned above water-saturated subterranean zone 24. This zone is shown as zone 26 and, as indicated, is referred to as the capillary fringe zone. This zone is water-wet by water which has moved upward from the water table; i.e., the top of the liquid level in water-saturated subterranean formation 24 into the overlying formation by capillary action and the like.

When light hydrocarbons or other light non-aqueous liquids are spilled at the surface, such liquids tend to be absorbed by the ground and pass downwardly through the vadose zone 22 to accumulate on the top of the liquid level in water-saturated subterranean zone 24 in a layer shown as a layer 72. These liquids are not effectively recovered by producing liquids from wellbore 12 or by other techniques such as the use of reduced pressure in wellbore 12 to vaporize the light non-aqueous liquids from the liquid surface. Upon observation of FIG. 1, it should be noted that the surface available for vaporization of the light non-aqueous liquids in layer 72 is limited to the cross-sectional area of wellbore 12 in the absence of wick 32. Light non-aqueous liquids which may be contained in the upper portion of capillary fringe zone 26 or in the lower portions of vadose zone 22 may be partially recovered by use of a vacuum or reduced pressure, but these materials predominately migrate toward layer 72 where they accumulate above the water table.

According to the present invention, well 10 is drilled to penetrate water-saturated subterranean zone 24 and then cased, screened and completed as discussed above. An oleophilic absorbent wick is then lowered into wellbore 12 so that at least a substantial length of oleophilic absorbent wick 32 extends into the light non-aqueous liquid/water in wellbore 12. The oleophilic absorbent wick then absorbs and wicks the light non-aqueous liquids from the water and from layer 72. As the light non-aqueous liquids are moved upwardly in wick 32 by capillary action, a much larger surface becomes available for the evaporation of such liquids. The light non-aqueous liquids are then evaporated by use of a blower (not shown) to draw light non-aqueous liquid vapors upwardly as shown by arrows 38 through wellbore 12 to discharge through line 30 as shown by arrow 40. As noted previously, wellbore 12 may extend to near the bottom of water-saturated subterranean zone 24 or it may be terminated at an intermediate depth which should be below the lowest water table level anticipated in well 10 as a result of seasonal fluctuations and the like. Similarly, screen 18 may extend to the bottom 70 of wellbore 12 or it may be terminated at an intermediate depth, all as known to those skilled in the art. As light non-aqueous liquid vapors are withdrawn from wellbore 12, air or other gaseous components contained in vadose zone 22 and to some extent in capillary fringe zone 26 are also drawn into wellbore 12 and passed to recovery via line 30.

The recovered light non-aqueous liquid vapors are passed via line 30 to thermal oxidation, or optionally to recovery or the like. The present method provides an expanded surface area for the evaporation of such light non-aqueous liquids as they move upwardly through oleophilic absorbent wick 32. In the event that oleophilic absorbent wick 32 becomes contaminated with non-volatile or other materials, becomes weakened by continued exposure to the environment in wellbore 12 or the like, it is readily replaced by simply withdrawing it by a line 34 which is used to support and adjust the depth of wick 32 in wellbore 12. Wick 32 is then readily replaced with a fresh wick.

Desirably, wick 32 extends into water-saturated zone 24 a sufficient distance to absorb light non-aqueous liquids from layer 72. Typically, wick 32 extends at least three feet into the water in wellbore 12. The wick 32 may extend to any desired depth into the water in wellbore 12 but should extend for a sufficient distance above layer 72 to provide sufficient area to permit the vaporization of light non-aqueous liquids. Desirably, wick 32 extends above layer 72 a distance sufficient to take full advantage of the upward movement of light non-aqueous liquids in wick 32 so that maximum evaporation may be accomplished. This distance will vary substantially based upon conditions in the wellbore, the particular light non-aqueous liquids present and the like.

The light non-aqueous liquids typically will comprise light hydrocarbons such as diesel fuel, kerosine, gasoline or lighter hydrocarbons, solvents, possibly halogenated or other organic compounds and the like. Substantially any such liquids which are suitably volatile at the conditions in wellbore 12 may be recovered by the method of the present invention.

Figure 2:
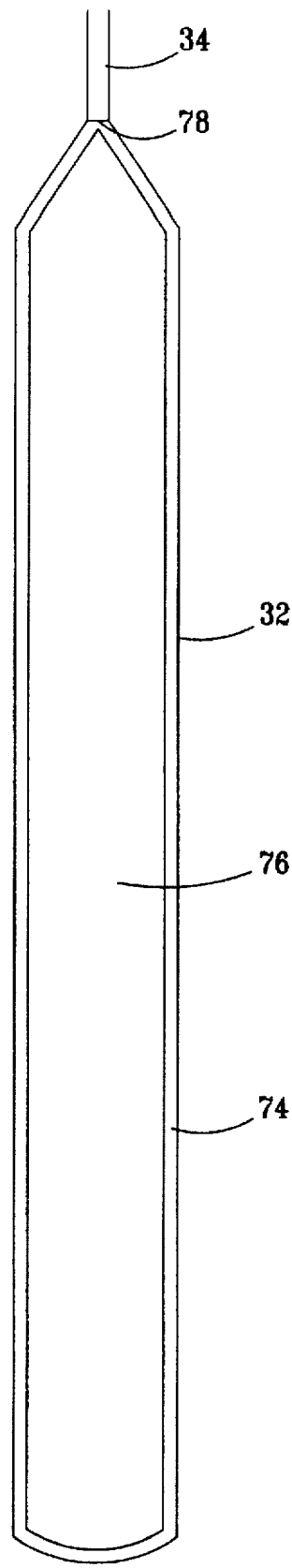
FIG. 2 shows an embodiment of the absorbent oleophilic wick of the present invention; and, FIG. 3 shows an alternate embodiment of the oleophilic absorbent wick used in the wellbore.

In FIG. 2, an embodiment of the oleophilic absorbent wick of the present invention is shown. Wick 32 comprises an outer durable covering 74. A nylon fabric or mesh is particularly suitable for the outer covering. An inner sock, (not shown) packed with a particulant oleophilic absorbent material 76 is positioned inside outer covering 74. The inner sock may be fabricated of any suitably porous fabric. Porous polyethylene fabric is one suitable fabric. This material is very effective to absorb and move light non-aqueous liquids upwardly in wick 32 for evaporation from the portions of wick 32 above the liquid level in wellbore 12. Wick 32 is supported by a suitable hanger at 78 (not shown) and is supported from the surface by a line 34. Wick 32 is readily replaceable at any time by simply withdrawing wick 32 by the use of line 34 and replacing the wick. Substantially any oleophilic absorbent material which is sufficiently permeable to permit the upward movement of the light non-aqueous liquids either through the particulant material or through the space between the particles is suitable. One particularly suitable material is sodium potassium alumina silicate marketed by Absorbent Technologies, Inc., Post Office Box 1131, Atascadero, Calif. 93423 under the trademark XSORB UNIVERSAL for use as an all purpose absorbent for liquids and semi-liquids. This material is also useful in oil booms for absorbing oil from aqueous environments.

Figure 3:
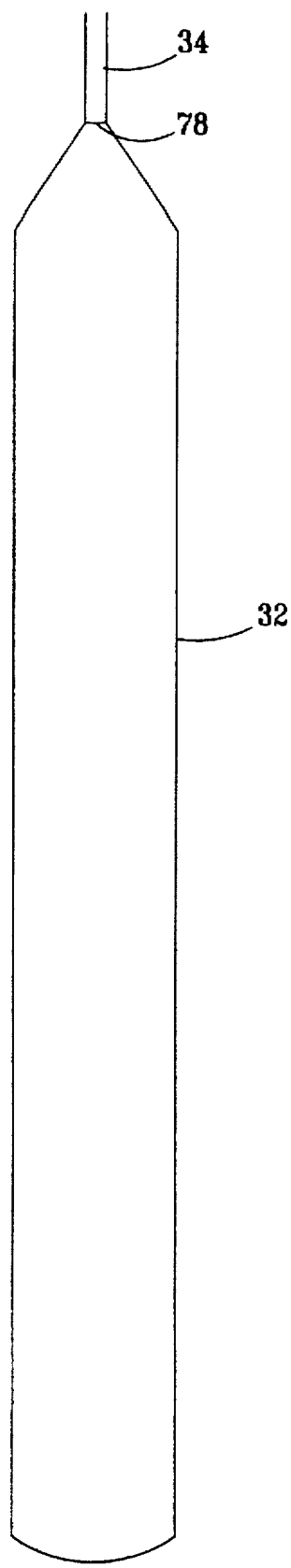

In FIG. 3, an alternate embodiment is shown wherein wick 32 comprises a woven oleophilic absorbent material such as a woven nylon member. In either embodiment, a variety of materials can be used and the operation of wick 32 shown in FIG. 3 is substantially the same as discussed in conjunction with the embodiment shown in FIG. 2.

The invention is desirably practiced using a system comprising a wellbore positioned from a surface location to extend through at least a portion of a subterranean water-saturated zone; an oleophilic absorbent wick positioned in the wellbore with its lower end extending below a liquid level in the wellbore, and its upper end extending above the liquid level; a line in fluid communication with the wellbore and a vaporized light non-aqueous liquids outlet and a blower in fluid communication with the wellbore and the vaporized light non-aqueous liquids outlet. The system includes an oleophilic absorbent wick as discussed above.

As noted previously, when the wick becomes loaded with non-volatile, non-aqueous components at the temperature and pressure conditions in wellbore 12, the wick may be removed and replaced. Similarly, in the event that the wick is deteriorated by conditions in wellbore 12 over a period of time, it may be removed and replaced. By the practice of the present invention, light non-aqueous liquids are readily recovered from a subterranean formation by evaporation by drawing liquids into a wick which provides a large surface area from which the liquids may be vaporized for ready recovery. The recovered vaporized light non-aqueous liquids are typically passed to thermal oxidation and the like. The vacuum required in well 10 is produced by a blower which typically may be used to produce vacuums of up to about 70 to 80 inches of water or higher if desired. While other types of apparatus could be used to create the vacuum, it is preferred that blowers be used, since the blowers are capable of producing the desired vacuum and since they are also capable of moving a relatively large volume of gas.

The system and method of the present invention may also be used in combination with air injection wells if desired.

Having thus described the invention by reference to certain of its preferred embodiments, it is pointed out that the embodiments discussed are illustrative rather than limiting in nature and that many variations and modifications are possible within the scope of the present invention. Many such variations and modifications may be considered obvious and desirable by those skilled in the art, based upon a review of the foregoing description of preferred embodiments.

Having thus described the invention, I claim:

1. A method for removing light non-aqueous liquids via a wellbore from at least one of a vadose zone, a capillary fringe zone and a water saturated zone using an oleophilic absorbent wick, the method comprising:
   a. positioning a wellbore to extend through at least a portion of the subterranean water-saturated zone;
   b. positioning an oleophilic absorbent wick in the wellbore, the wick being positioned with its lower end extending below a liquid level in the wellbore and its upper end extending above the liquid level;
   c. reducing the pressure in the wellbore thereby vaporizing light non-aqueous liquids from a portion of the wick extending above the liquid level in the wellbore; and,
   d. withdrawing vaporized light non-aqueous liquids from the wellbore.

2. The method of claim 1 wherein at least a portion of the light non-aqueous liquids are in the capillary zone.

3. The method of claim 1 wherein the wick extends for a length up to three feet below the liquid level.

4. The method of claim 1 wherein the light non-aqueous liquids are light hydrocarbons.

5. The method of claim 1 wherein the oleophilic wick comprises a sodium potassium alumina silicate.

6. The method of claim 1 wherein the liquid level in the wellbore is at about the top of the water-saturated zone.

7. A system for removing light non-aqueous liquids via a wellbore from at least one of a vadose zone, a capillary fringe zone and a water-saturated zone using an oleophilic absorbent wick, the system comprising:
   a. a wellbore positioned from a surface location to extend through at least a portion of the subterranean water-saturated zone;
   b. an oleophilic absorbent wick positioned in the wellbore with its lower end extending below a liquid level in the wellbore and its upper end extending above the liquid level;
   c. a line in fluid communication with the wellbore and a vaporized light non-aqueous liquids outlet; and,
   d. A blower in fluid communication with the wellbore and the vaporized liquids outlet.

8. The system of claim 7 wherein the wick extends for a length up to three feet below the liquid level.

9. The system of claim 7 wherein the oleophilic wick comprises a porous oleophilic substance formed into an elongated wick.

10. The system of claim 7 wherein the oleophilic wick comprises a sodium potassium alumina silicate.

11. The system of claim 7 wherein the oleophilic wick is replaceably supported in position in the wellbore.

* * * * *

UNITED STATES PATENT AND TRADEMARK OFFICE
CERTIFICATE OF CORRECTION

PATENT NO. : 5,794,698
DATED : Roberts
INVENTOR(S) : Charles T. Roberts

It is certified that error appears in the above-identified patent and that said Letters Patent is hereby corrected as shown below:

Column 3, line 53, a new sentence is added as follows: "The air of other gaseous components invadose zone 22 move toward and into wellbore 12 as shown by arrows 36."

Column 3, line 63, insert "support" before --line 34--.

Column 4, line 31, insert "support" before --line 34--.

Signed and Sealed this

Twenty-third Day of February, 1999

Attest:

Q. TODD DICKINSON

*Attesting Officer*    *Acting Commissioner of Patents and Trademarks*